US011570641B2

(12) United States Patent
Hong

(10) Patent No.: US 11,570,641 B2
(45) Date of Patent: Jan. 31, 2023

(54) WIRELESS ACCESS METHOD AND APPARATUS

(71) Applicant: BEIJING XIAOMI MOBILE SOFTWARE CO., LTD., Beijing (CN)

(72) Inventor: Wei Hong, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 98 days.

(21) Appl. No.: 17/043,604

(22) PCT Filed: Apr. 18, 2018

(86) PCT No.: PCT/CN2018/083452
§ 371 (c)(1),
(2) Date: Sep. 29, 2020

(87) PCT Pub. No.: WO2019/200550
PCT Pub. Date: Oct. 24, 2019

(65) Prior Publication Data
US 2021/0022023 A1    Jan. 21, 2021

(51) Int. Cl.
*H04W 24/08* (2009.01)
*H04W 48/16* (2009.01)
*H04W 48/20* (2009.01)

(52) U.S. Cl.
CPC .......... *H04W 24/08* (2013.01); *H04W 48/16* (2013.01); *H04W 48/20* (2013.01)

(58) Field of Classification Search
CPC ...... H04W 24/08; H04W 48/16; H04W 48/20
See application file for complete search history.

(56) References Cited

U.S. PATENT DOCUMENTS

| 2015/0373601 | A1* | 12/2015 | Benjebbour | .......... | H04W 16/32 |
| | | | | | 370/252 |
| 2016/0219475 | A1* | 7/2016 | Kim | ...................... | H04W 76/28 |
| 2018/0092017 | A1* | 3/2018 | Freda | .................... | H04W 36/36 |

(Continued)

FOREIGN PATENT DOCUMENTS

| CN | 1471279 A | 1/2004 |
| CN | 105992368 A | 10/2016 |

(Continued)

OTHER PUBLICATIONS

International Search Report in the international application No. PCT/CN2018/083452, dated Jan. 4, 2019.

(Continued)

*Primary Examiner* — Steven H Nguyen
(74) *Attorney, Agent, or Firm* — Syncoda LLC; Feng Ma

(57) ABSTRACT

A wireless access method includes: carrying out wireless signal measurement on candidate host base stations to obtain a measurement result, an NR wireless backhaul base station communicates with each candidate host base station by means of an air interface, and the each candidate host base station connects to a macro base station by means of a wired backhaul link; selecting, according to the measurement result, at least one target host base station among the candidate host base stations; and sending an access request to the each target base station, the access request being used to request the each target host base station to allocate radio resources for the NR wireless backhaul base station.

15 Claims, 16 Drawing Sheets

(56) References Cited

U.S. PATENT DOCUMENTS

2018/0124677 A1* 5/2018 He ..................... H04W 40/24
2018/0138965 A1* 5/2018 Martin ................ H04W 48/20

FOREIGN PATENT DOCUMENTS

| CN | 106162817 A | 11/2016 |
| CN | 106302620 A | 1/2017 |
| CN | 106572480 A | 4/2017 |
| CN | 108702641 A | 10/2018 |

OTHER PUBLICATIONS

English translation of the Written Opinion of the International Search Authority in the international application No. PCT/CN2018/083452, dated Jan. 4, 2019.
First Office Action of the Chinese application No. 201880000488.4, dated Jul. 3, 2020.

* cited by examiner

WIRELESS ACCESS METHOD AND APPARATUS

CROSS-REFERENCE TO RELATED APPLICATIONS

The present application is a national stage of International Application No. PCT/CN2018/083452 filed on Apr. 18, 2018, the disclosure of which is hereby incorporated by reference in its entirety.

TECHNICAL FIELD

The disclosure relates to the technical field of communications, and particularly, to a radio access method and device.

BACKGROUND

Over the past 30 years, the mobile communication has undergone leap-forward development from voice services to the mobile bandwidth data services, which not only changed people's lifestyles greatly but also propelled social and economic development considerably. The Fifth-Generation (5G) mobile communication technology is required to meet people's needs for ultra-high traffic density, ultra-high connection density and ultra-high mobility, and will enable users to experience excellent services such as high-definition videos, virtual reality, enhanced reality, cloud desktops, online games. The infiltration of the 5G technology into the fields such as the Internet Of Things and its deep integration with industrial facilities, medical equipment, means of traffic and the like will achieve "the Internet Of Things" in all respects and effectively meet the needs for information services of vertical industries such as the industry, the medical services, and the traffic. These needs pose a tough challenge to 5G systems. A 5G network needs to increase the frequency spectrum efficiency dramatically in order to meet the requirements of future 5G network services for greater diversity, higher speed and a greater number of connections. The high-frequency communication technology is an important candidate technology that can increase the frequency spectrum efficiency and achieve an ultra-high speed in the 5G network. Plentiful standardization works on the high-frequency communication have been made in the 3rd Generation Partnership Project (3GPP).

Since a high frequency band has some space transmission features including great transmission loss, the high frequency-band communication is often adopted by small base stations. In prior art, in order to connect a great number of small base stations to a macro base station, transmission resources such as optical fibers are needed to respectively connect these small base stations, each of which is configured with optical fiber backhaul, to the macro base station. However, the configuration of the optical fibers costs a lot.

SUMMARY

A radio access method and device are provided in the embodiments of the disclosure. The technical solutions are as follows.

A first aspect according to the embodiments of the disclosure provides a radio access method applied to a New Radio (NR) wireless backhaul base station, the method including:

wireless signal measurement is performed on candidate donor base stations to obtain a measurement result, herein the NR wireless backhaul base station communicates with each candidate donor base station through an air interface, and each candidate donor base station connects to a macro base station through a wired backhaul link;

at least one target donor base station is selected from among the candidate donor base stations according to the measurement result; and an access request is transmitted to each target donor base station, herein the access request is used for requesting each target donor base station to allocate a radio resource to the NR wireless backhaul base station.

The technical solutions in the embodiment of the disclosure may have beneficial effects as follows: in the technical solutions, the NR wireless backhaul base station establishes a wireless connection to the candidate donor base stations through the air interface and transmit the access request to the selected at least one target donor base station so that the NR wireless backhaul base station may connect to one or more donor base stations. In this way, the coverage of a 5G NR network is increased and its performance is improved; moreover, deployment of the NR wireless backhaul base stations does not have to rely on transmission resources such as optical fibers, thus the NR wireless backhaul base stations can be deployed rapidly and at low cost.

In an embodiment, the method further includes: before the wireless signal measurement is performed on the candidate donor base stations to obtain the measurement result, a broadcast message is received from at least one donor base station, herein the broadcast message of each donor base station carries indication information used for indicating whether each donor base station connects to the macro base station through the wired backhaul link; and the donor base stations that connect to the macro base station through the wired backhaul link is determined as the candidate donor base stations according to the broadcast message of each donor base station.

In an embodiment, the method further includes:

an access response is received from each target donor base station, herein each access response carries the radio resource allocated by each target donor base station to the NR wireless backhaul base station.

A second aspect according to the embodiments of the disclosure provides a radio access method applied to a target donor base station, the method including:

an access request is received from an NR wireless backhaul base station, herein the access request is used for requesting the target donor base station to allocate a radio resource to the NR wireless backhaul base station, and the NR wireless backhaul base station communicates with the target donor base station through an air interface.

whether access requested by the NR wireless backhaul base station is permitted is determined according to the access request.

In an embodiment, the method further includes: before the access request is received from the NR wireless backhaul base station, a broadcast message is transmitted, herein the broadcast message carries indication information used for indicating whether the target donor base station connects to a macro base station through a wired backhaul link.

In an embodiment, the operation that whether access requested by the NR wireless backhaul base station is permitted is determined according to the access request includes:

the access request is forwarded to a macro base station;

an access decision message for the access request is received from the macro base station; and whether the access requested by the NR wireless backhaul base station is permitted is determined according to the access decision message.

In an embodiment, the method further includes: after whether access requested by the NR wireless backhaul base station is permitted is determined according to the access request, when it is determined that the access requested by the NR wireless backhaul base station is permitted, the radio resource is allocated to the NR wireless backhaul base station, and an access response is transmitted to the NR wireless backhaul base station, herein the access response carries the radio resource allocated by the target donor base station to the NR wireless backhaul base station, or when it is determined that the access requested by the NR wireless backhaul base station is not permitted, an access failure message is transmitted to the NR wireless backhaul base station, herein the access failure message carries indication information used for indicating that the NR wireless backhaul base station is not permitted to access the target donor base station.

A third aspect according to the embodiments of the disclosure provides a radio access device including:

a measuring module, configured to perform wireless signal measurement on candidate donor base stations to obtain a measurement result, herein the NR wireless backhaul base station communicates with each candidate donor base station through an air interface, and each candidate donor base station connects to a macro base station through a wired backhaul link;

a selecting module, configured to select at least one target donor base station from among the candidate donor base stations according to the measurement result; and a first transmitting module, configured to transmit an access request to each target donor base station, herein the access request is used for requesting each target donor base station to allocate a radio resource to the NR wireless backhaul base station.

In an embodiment, the device further includes:

a first receiving module, configured to receive a broadcast message from at least one donor base station, herein the broadcast message of each donor base station carries indication information used for indicating whether each donor base station connects to the macro base station through the wired backhaul link; and a determining module, configured to determine, according to the broadcast message of each donor base station, the donor base stations that connect to the macro base station through the wired backhaul link as the candidate donor base stations.

In an embodiment, the device further includes:

a second receiving module, configured to receive an access response from each target donor base station, herein each access response carries the radio resource allocated by each target donor base station to the NR wireless backhaul base station.

A fourth aspect according to the embodiments of the disclosure provides a radio access device including:

a third receiving module, configured to receive an access request from an NR wireless backhaul base station, herein the access request is used for requesting the target donor base station to allocate a radio resource to the NR wireless backhaul base station, and the NR wireless backhaul base station communicates with the target donor base station through an air interface; and a determining module, configured to determine according to the access request whether to permit access requested by the NR wireless backhaul base station.

In an embodiment, the device further includes:

a second transmitting module, configured to transmit a broadcast message, herein the broadcast message carries indication information used for indicating whether the target donor base station connects to a macro base station through a wired backhaul link.

In an embodiment, the determining module is configured to: forward the access request to a macro base station; receive an access decision message for the access request from the macro base station; and determine according to the access decision message whether to permit the access requested by the NR wireless backhaul base station.

In an embodiment, the device further includes:

a third transmitting module, configured to, in response to determining that the access requested by the NR wireless backhaul base station is permitted, allocate the radio resource to the NR wireless backhaul base station, and transmit an access response to the NR wireless backhaul base station, herein the access response carries the radio resource allocated by the target donor base station to the NR wireless backhaul base station; or a fourth transmitting module, configured to, in response to determining that the access requested by the NR wireless backhaul base station is not permitted, transmit an access failure message to the NR wireless backhaul base station, herein the access failure message carries indication information used for indicating that the NR wireless backhaul base station is not permitted to access the target donor base station.

A fifth aspect according to the embodiments of the disclosure provides a radio access device including:

a processor;

a memory configured to store instructions executable by the processor, herein, the processor is configured to:

perform wireless signal measurement on candidate donor base stations to obtain a measurement result, herein the NR wireless backhaul base station communicates with each candidate donor base station through an air interface, and each candidate donor base station connects to a macro base station through a wired backhaul link;

select at least one target donor base station from among the candidate donor base stations according to the measurement result; and transmit an access request to each target donor base station, herein the access request is used for requesting each target donor base station to allocate a radio resource to the NR wireless backhaul base station.

A sixth aspect according to the embodiments of the disclosure provides a radio access device including:

a processor;

a memory configured to store instructions executable by the processor, herein, the processor is configured to:

receive an access request from an NR wireless backhaul base station, herein the access request is used for requesting the target donor base station to allocate a radio resource to the NR wireless backhaul base station, and the NR wireless backhaul base station communicates with the target donor base station through an air interface; and determine according to the access request whether to permit access requested by the NR wireless backhaul base station.

A seventh aspect according to the embodiments of the disclosure provides a computer-readable storage medium having stored thereon computer instructions that, when executed by a processor, cause the method in the above first aspect to be implemented.

An eighth aspect according to the embodiments of the disclosure provides a computer-readable storage medium having stored thereon computer instructions that, when executed by a processor, cause the method in the above first aspect to be implemented.

It is to be understood that the above general descriptions and detailed descriptions below are only exemplary and explanatory and not intended to limit the present disclosure.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of devices and methods consistent with aspects related to the present disclosure as recited in the appended claims.

Figure 1:
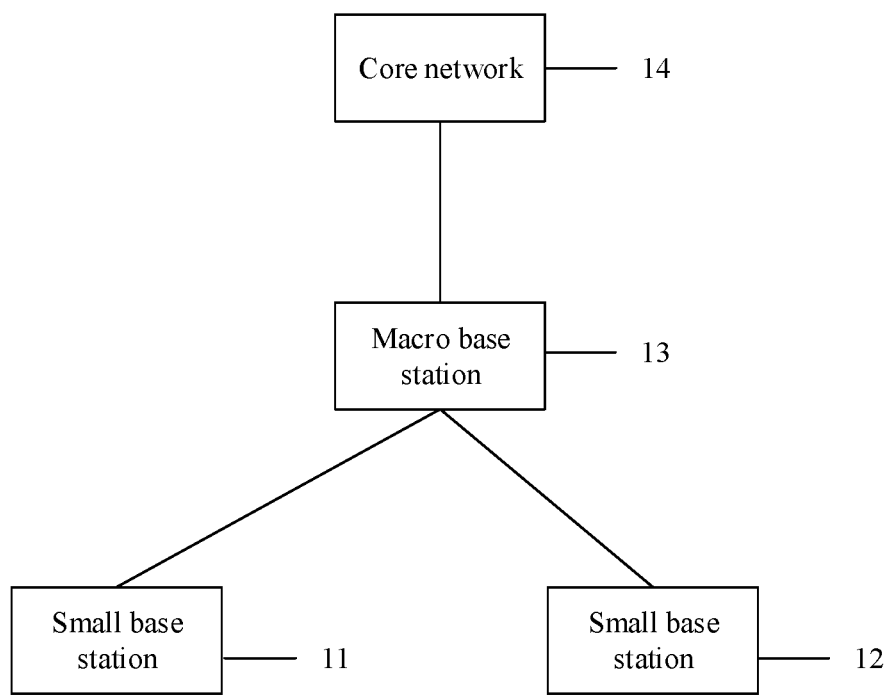
FIG. 1 is a schematic diagram of networking in which small and medium-sized base stations connect to a macro base station through optical fibers in related technologies.

In prior art, in order to make a small base station connect to a macro base station, transmission resources such as optical fibers are needed to respectively connect a great number of small base stations, each of which is configured with optical fiber backhaul, to the macro base station. A schematic diagram of networking illustrated in FIG. 1 includes small base stations 11 and 12, a macro base station 13 and a core network 14. The small base stations 11 and 12 respectively establish a wired connection to the macro base station 13 via an optical fiber and the macro base station 13 is connected to the core network 14. It can be seen that in 5G dense networking, a lot of small base stations are in need of a huge number of optical fibers and suitable stations need to be selected to support deployment of backhaul devices. As a result, deployment of backhaul links based on the optical fibers costs a lot and deployment of the optical fibers has a long cycle.

A radio access method is provided in the embodiments of the disclosure to solve the above problem. The method includes following operations: wireless signal measurement is performed on candidate donor base stations to obtain a measurement result, an NR wireless backhaul base station communicates with each candidate donor base station through an air interface, and each candidate donor base station connects to a macro base station through a wired backhaul link; at least one target donor base station is selected from among the candidate donor base stations according to the measurement result; an access request used for requesting each target donor base station to allocate a radio resource to the NR wireless backhaul base station is transmitted to each target donor base station. In the radio access method provided in the embodiments of the disclosure, the NR wireless backhaul base station maintains wireless connections with the candidate donor base stations through air interfaces. The NR wireless backhaul base station may connect to one or more donor base stations by transmitting access requests to the selected at least one target donor base station. In this way, the coverage of a 5G NR network is increased and its performance is improved. In addition, the NR wireless backhaul base stations can be deployed independent of the transmission resources such as the optical fibers, thus can be deployed rapidly and at low cost.

Figure 2:
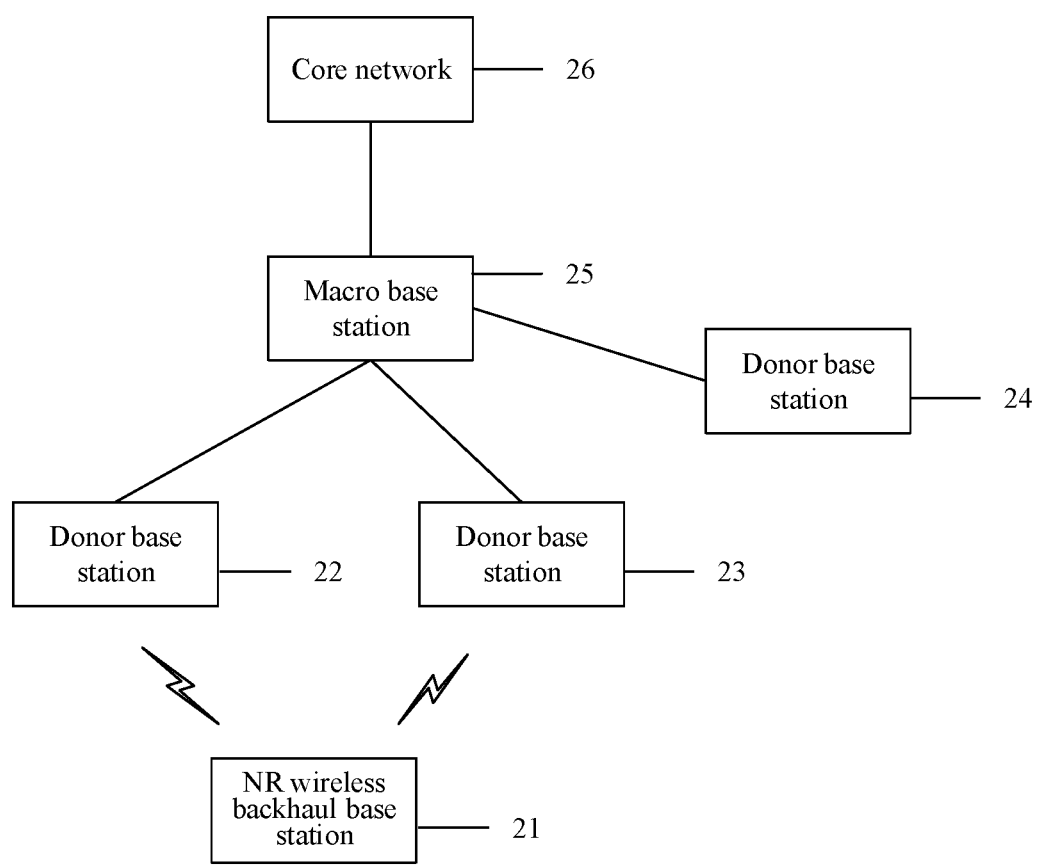
FIG. 2 is a diagram of an application scenario of a radio access method according to an exemplary embodiment.

The technical solutions described in the embodiment of the disclosure provide an NR access method based on the NR wireless backhaul links that replace the optical fiber backhaul in the method. FIG. 2 illustrates an optional application scenario of a radio access method according to an embodiment of the disclosure. The application scenario illustrated in FIG. 2 involves an NR wireless backhaul base station 21, donor base stations 22, 23 and 24, a macro base station 25 and a core network 26. The NR wireless backhaul base station 21 may establish a wireless connection with each donor base station through an air interface. The donor base stations 22, 23 and 24 maintain wireless links with the macro base station 25. The application scenario illustrated in FIG. 2 is only a possible exemplary application scenario in the technical solutions described in the embodiment of the disclosure. Other application scenarios may include devices and networks that are not included in FIG. 2.

Following detailed embodiments are put forward based on the above analysis.

Figure 3:
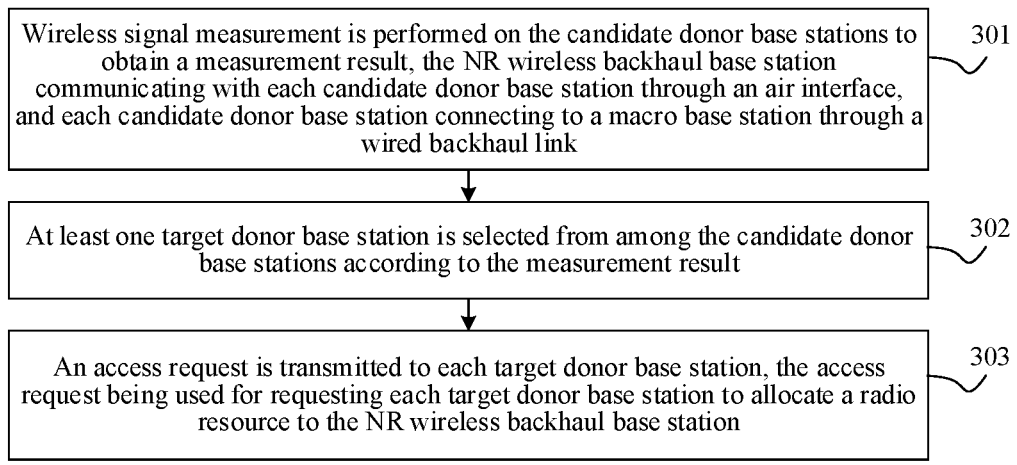
FIG. 3 is a flowchart of a radio access method according to an exemplary embodiment.

FIG. 3 is a flowchart of a radio access method according to an exemplary embodiment. The radio access method may be applied to an NR wireless backhaul base station in a 5G NR communication network. The method may be performed by the NR wireless backhaul base station that has a wireless communication with each donor base station through an air interface. As illustrated in FIG. 3, the method includes operations 301 to 303.

In operation 301, wireless signal measurement is performed on the candidate donor base stations to obtain a measurement result. The NR wireless backhaul base station communicates with each candidate donor base station through an air interface, and each candidate donor base station connects to a macro base station through a wired backhaul link.

For example, the NR wireless backhaul base station is a base station, which provides a radio access service for users in a 5G NR network, and may establish communication connections with donor base stations through the air interfaces.

For example, the NR wireless backhaul base station may obtain information including base station identifiers of the candidate donor base stations in advance. For example, each donor base station transmits in advance a broadcast message that carries indication information used for indicating whether the donor base station connects to the macro base station through a wired backhaul link; after receiving the broadcast messages from at least one donor base stations, the NR wireless backhaul base station determines the donor base stations connecting to the macro base station through the wired backhaul links as the candidate donor base stations according to the broadcast message transmitted by each donor base station.

The NR wireless backhaul base station performs the wireless signal measurement on each candidate donor base station to obtain the measurement result of each candidate donor base station's wireless signal. For example, the NR wireless backhaul base station measures, based on the base station identifier of each candidate donor base station, parameters including a strength and a quality of a downlink signal that the NR wireless backhaul base station receives from each candidate donor base station so that the intensity or the quality of the downlink signal of each candidate donor base station is obtained. The wireless measurement result may include the intensity or the quality of the downlink signal received from each candidate donor base station.

In operation 302, at least one target donor base station is selected from among the candidate donor base stations according to the measurement result.

For example, the NR wireless backhaul base station select the at least one target donor base station from among the candidate donor base stations according to the measurement result. For example, according to the measurement result, the NR wireless backhaul base station selects one or more candidate donor base stations that receive signals of a greatest strength or signals of strengths greater than a preset value from among the candidate donor base stations, determine the selected candidate donor base stations as the target donor base stations and requests access to the target donor base stations. For another example, the NR wireless backhaul base station determines to request the access to the target donor base stations according to the measurement result and requirements including Quality Of Services (QOSs) or priorities of services of users that wait to access.

In operation S303, an access request is transmitted to each target donor base station. The access request is used for requesting each target donor base station to allocate a radio resource to the NR wireless backhaul base station.

For example, the NR wireless backhaul base station transmits the access request to each target donor base station and requests each target donor base station to allocate the radio resource to the NR wireless backhaul base station. After receiving the access requests from the NR wireless backhaul base station, the target donor base station determines whether to permit access requested by the NR wireless backhaul base station.

For example, the target donor base station that has received the access request may determine, either by itself or through negotiation with the macro base station to which it is connected, whether to permit the access requested by the NR wireless backhaul base station. For example, the target donor base station forwards the access request to the macro base station, receives an access decision message for the access request from the macro base station and determines, according to the access decision message, whether to permit the access requested by the NR wireless backhaul base stations.

For example, when the target donor base station determines to permit the access requested by the NR wireless backhaul base station, it allocates the radio resource to the NR wireless backhaul base station and transmits an access response to the NR wireless backhaul base station. The access response carries the radio resource allocated by the target donor base station to the NR wireless backhaul base station. In this case, when the NR wireless backhaul base station receives the access response from the target donor base station, it is determined that the NR access based on the NR wireless backhaul link is successful.

Alternatively, when the target donor base station determines not to permit the access requested by the NR wireless backhaul base station, the target donor base station may choose not to feed any message back to the NR wireless backhaul base station; if the NR wireless backhaul base station does not receive the access response from the target donor base station in a preset period of time, the NR access is judged to be a failure and the target donor base station may also transmit an access failure message to the NR wireless backhaul base stations. The access failure message carries indication information used for indicating that the NR wireless backhaul base station is not permitted to access the target donor base station.

The technical solutions provided by the embodiment of the disclosure enable the NR wireless backhaul base station to maintain wireless connections with the candidate donor base stations through the air interfaces. The NR wireless backhaul base station transmits the access requests to the selected at least one target donor base station so that it can connect to one or more donor base stations simultaneously. In this way, the coverage of a 5G NR network is increased and its performance is improved. In addition, the NR wireless backhaul base station may be deployed independent of transmission resources such as optical fibers, thus can be deployed rapidly and at low cost.

Figure 4:
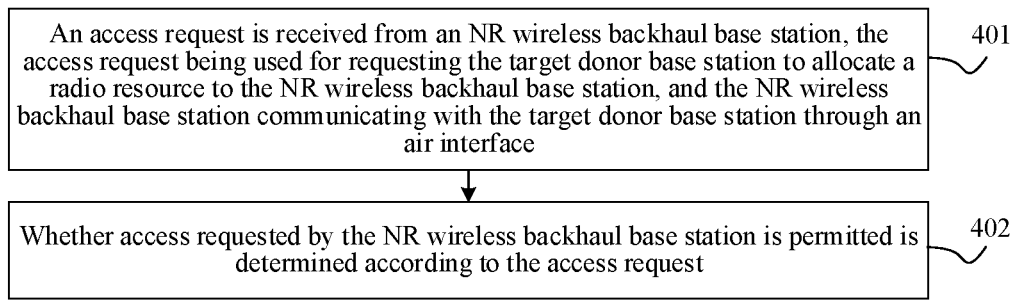
FIG. 4 is a flowchart of a radio access method according to an exemplary embodiment.

FIG. 4 is a flowchart of a radio access method according to an exemplary embodiment. The radio access method may be applied to an NR donor base station in a 5G NR communication network. The method may be performed by a target donor base station. An NR wireless backhaul base station has a wireless communication with the donor base station through an air interface. As illustrated in FIG. 4, the method includes operations 401 to 401.

In operation 401, an access request is received from an NR wireless backhaul base station. The access request is used for requesting the target donor base station to allocate a radio resource to the NR wireless backhaul base station. The NR wireless backhaul base station communicates with the target donor base station through an air interface.

In operation 402, whether access requested by the NR wireless backhaul base station is permitted is determined according to the access request.

The technical solutions provided in the embodiments of the disclosure enable the NR wireless backhaul base station to maintain a wireless connection with a candidate donor base station through the air interface. After receiving the access request from the NR wireless backhaul base station, the donor base station determines whether to permit the access requested by the NR wireless backhaul base station to complete the NR access based on a NR wireless backhaul link.

Figure 5:
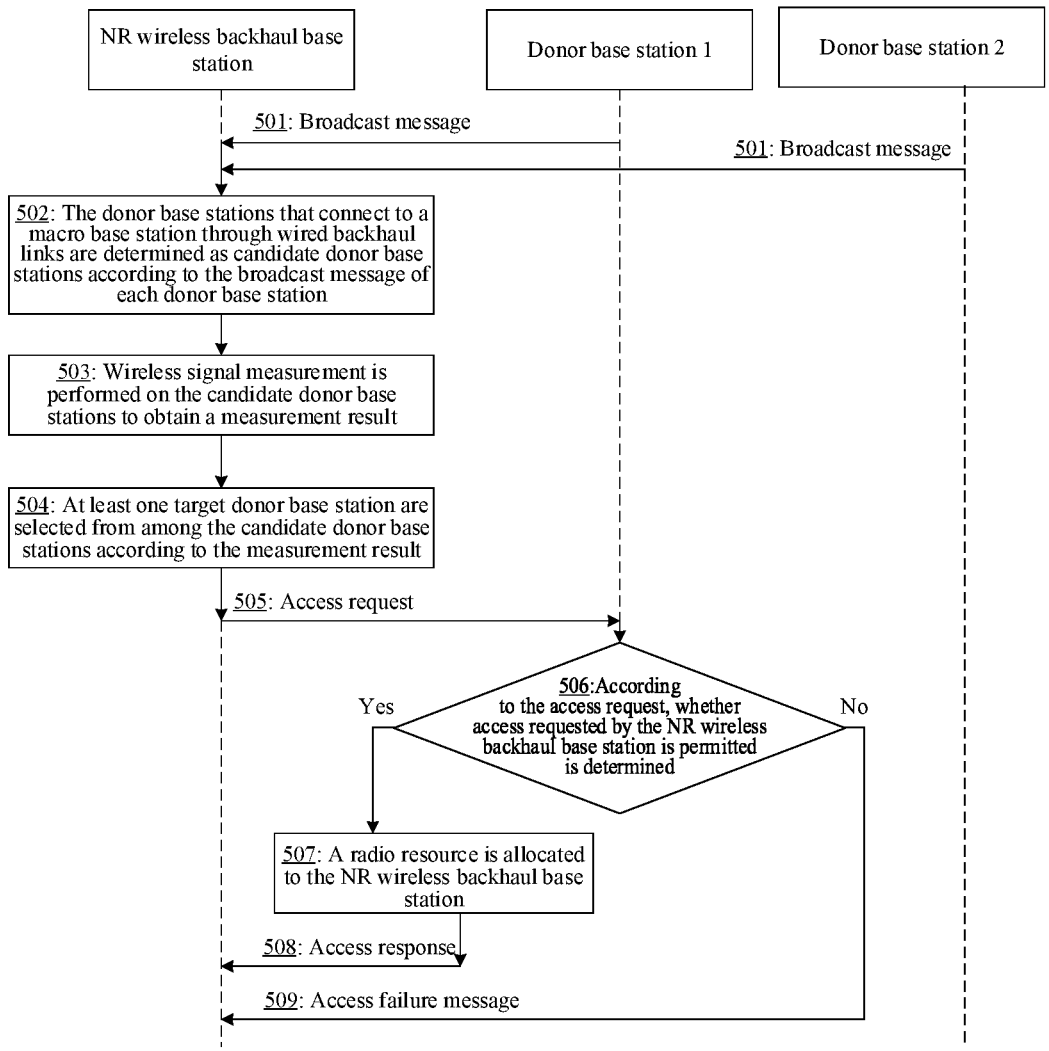
FIG. 5 is a flowchart of a radio access method according to an exemplary embodiment.

FIG. 5 is a flowchart of a radio access method according to an exemplary embodiment. The method is performed by an NR wireless backhaul base station in conjunction with multiple donor base stations. As illustrated in FIG. 5, based on the embodiment illustrated in FIG. 3, the radio access method described in the present invention may include following operations 501 to 509.

In operation 501, the donor base stations transmit broadcast messages that carry indication information used for indicating whether the donor base stations connect to a macro base station through wired backhaul links.

For example, a donor base station 1 transmits a broadcast message that carries the indication information used for indicating whether the donor base station 1 connects to the macro base station through a wired backhaul link; a donor base station 2 also transmits a broadcast message that carries the indication information used for indicating whether the donor base station 2 connects to the macro base station through a wired backhaul link.

In operation 502, the NR wireless backhaul base station receives the broadcast messages from at least one donor base station. The NR wireless backhaul base station communicates each candidate donor base station through an air interface. The NR wireless backhaul base station determines the donor base stations that connect to the macro base station through the wired backhaul links as the candidate donor base stations according to the broadcast message of each donor base station.

In operation 503, the NR wireless backhaul base station performs wireless signal measurement on the candidate donor base stations to obtain a measurement result.

In operation 504, the NR wireless backhaul base station selects at least one target donor base station from among the candidate donor base stations according to the measurement result.

For example, it is assumed that the NR wireless backhaul base station selects the donor base station 1 as one of the target donor base stations.

In operation 505, the NR wireless backhaul base station transmits an access request to each target donor base station. The access request is used for requesting each target donor base station to allocate a radio resource to the NR wireless backhaul base station.

For example, the NR wireless backhaul base station transmits an access request to the donor base station 1.

In operation 506, the donor base station receives the access request from the NR wireless backhaul base station and determines, according to the access request, whether to permit access requested by the NR wireless backhaul base station. When the access requested by the NR wireless backhaul base station is permitted, operation 507 is to be performed. When the access requested by the NR wireless backhaul base station is rejected, operation 509 is to be performed.

In operation 507, the donor base station allocates a radio resource to the NR wireless backhaul base station.

In operation 508, the donor base station transmits an access response to the NR wireless backhaul base station. The access response carries the radio resource that the target donor base station allocates to the NR wireless backhaul base station. The NR wireless backhaul base station receives the access response from each target donor base station. The process ends here.

In operation 509, the donor base station transmits a failure message to the NR wireless backhaul base station. The failure message carries indication information used for indicating that the NR wireless backhaul base station is not permitted to access the target donor base station.

In the embodiment, the NR wireless backhaul base station may connect to one or more donor base stations simultaneously, thus the coverage of a 5G NR network is increased and its performance is improved; with the broadcast messages sent initiatively by the donor base stations and indicating whether the donor base stations connect to the macro base station through the wired backhaul links, the NR wireless backhaul base station may merely request the access to the donor base stations that connect to the macro base station through the wired backhaul links. As a result, the NR wireless backhaul links are established more efficiently.

Figure 6:
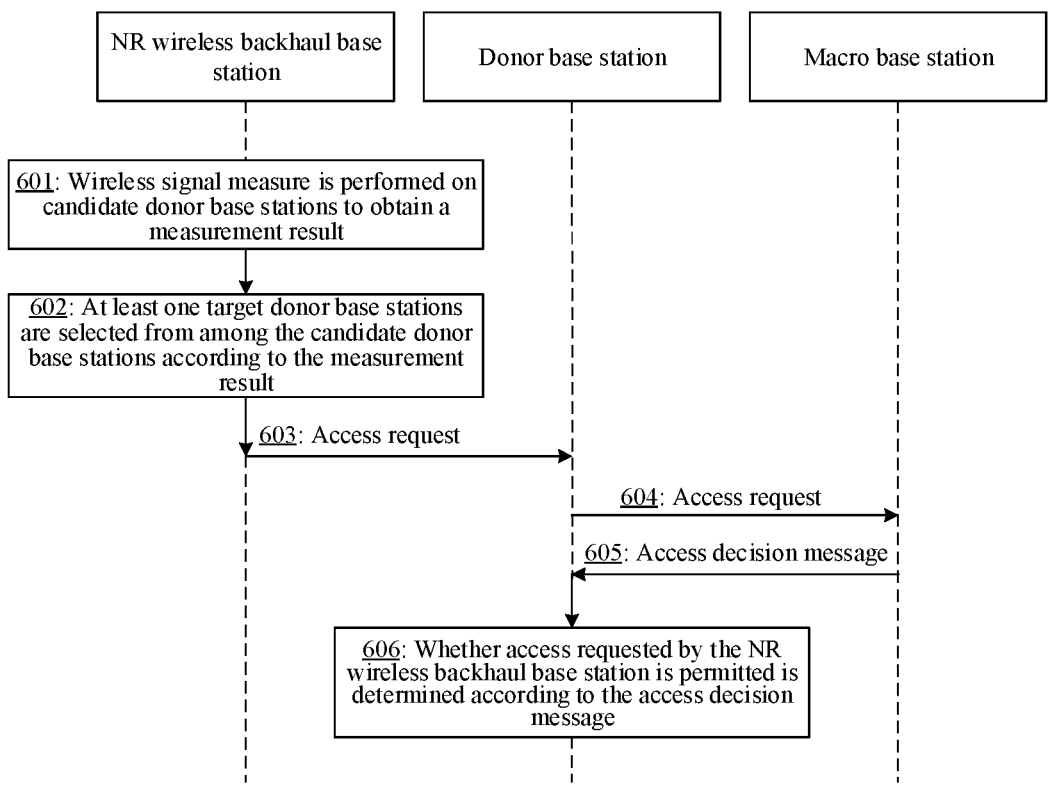
FIG. 6 is a flowchart of a radio access method according to an exemplary embodiment.

FIG. 6 is a flowchart of a radio access method according to an exemplary embodiment. The method is performed by an NR wireless backhaul base station in conjunction with donor base stations and a macro base station. As illustrated in FIG. 6, based on the embodiment illustrated in FIG. 3, the radio access method described in the present invention may include following operations 601 to 606.

In operation 601, the NR wireless backhaul base station performs wireless signal measurement on candidate donor base stations to obtain a measurement result and communicates with each candidate donor base station through an air interface. Each candidate donor base station connects to the macro base station through a wired backhaul link.

In operation 602, the NR wireless backhaul base station selects at least one target donor base station from among the candidate donor base stations according to the measurement result.

In operation 603, the NR wireless backhaul base station transmits an access request to each target donor base station. The access request is used for requesting each target donor base station to allocate a radio resource to the NR wireless backhaul base station.

In operation 604, the donor base station receives the access request from the NR wireless backhaul base station and forwards the access requests to the macro base station.

In operation 605, the donor base stations receives an access decision message for the access request from the macro base station In operation 606, the donor base station determines, according to the access decision message, whether to permit the access requested by the NR wireless backhaul base station.

For example, when it is determined that the access requested by the NR wireless backhaul base station is permitted, the donor base station allocates a radio resource to the NR wireless backhaul base station and transmits an access response to the NR wireless backhaul base station. The access response carries the radio resource that the target donor base station allocates to the NR wireless backhaul base station. When it is determined that the access requested by the NR wireless backhaul base station is rejected, the donor base station transmits an access failure message to the NR wireless backhaul base station. The access failure message carries indication information used for indicating the NR wireless backhaul base station is not permitted to access the target donor base station.

In the embodiment, after receiving the access request, the donor base station determines, through negotiation with the macro base station to which it is connected, whether to permit the access requested by the NR wireless backhaul base station. Thus, the efficiency of radio access can be improved.

Based on the above embodiments, an NR radio access method based on NR backhaul links is provided in a possible embodiment. With a macro base station being a Long-Term Evolution (LTE) base station, the method may include following operations 1) and 3).

In operation 1), NR donor base stations transmit broadcast signalings indicating that they have wired backhaul connections with an LTE base station.

In operation 2), after receiving the broadcast signalings from the NR donor base stations, the NR wireless backhaul base station measures the NR donor base stations having the wired backhaul connections with the LTE base station, selects one or more NR donor base stations according to a certain rule and transmits access requests to the selected NR donor base station(s).

In operation 3), after receiving the access requests from the NR wireless backhaul base station, the NR donor base stations negotiate with the LTE base station to which they are connected and determine whether to permit the access requested by the NR wireless backhaul base station.

If the access requests of the NR wireless backhaul base station are accepted, the NR donor base stations accept the access requests from the NR wireless backhaul base station, and the LTE base station needs to record correspondences between the NR wireless backhaul base station and the NR donor base stations accessed by the NR wireless backhaul base station.

If the access requests of the NR wireless backhaul base station are rejected, the NR donor base stations reject the access requests transmitted by the NR wireless backhaul base station.

In the embodiment, in a standalone (SA) networking architecture, a 5G NR wireless backhaul base station may connect to one or more donor base stations, thus the coverage of a 5G NR network is increased and its performance is improved.

The device embodiments of the disclosure are as follows and may be used to perform the method embodiments of the disclosure.

Figure 7:
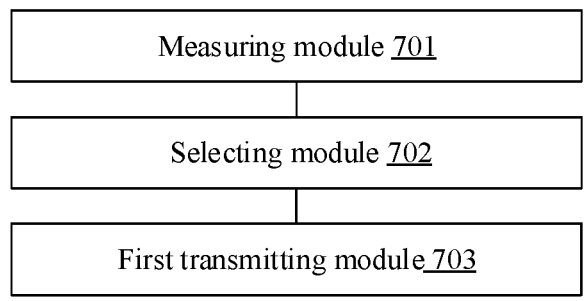
FIG. 7 is a block diagram of a radio access device according to an exemplary embodiment.

FIG. 7 is a block diagram of a radio access device according to an exemplary embodiment. The device may be implemented by software, hardware or a combination of the software and the hardware to become a part of an NR wireless backhaul base station or a complete NR wireless backhaul base station. As illustrated in FIG. 7, the radio access device includes: a measuring module 701, a selecting module 702 and a first transmitting module 703.

The measuring module 701 is configured to perform wireless signal measurement on candidate donor base stations to obtain a measurement result. An NR wireless backhaul base station communicates with each candidate donor base station through an air interface, and each candidate donor base station connects to a macro base station through a wired backhaul link.

The selecting module 702 is configured to select at least one target donor base station from among the candidate donor base stations according to the measurement result.

The first transmitting module 703 is configured to transmit an access request to each target donor base station. The access request is used for requesting each target donor base station to allocate a radio resource to the NR wireless backhaul base station The device provided in the embodiment of the disclosure enables the NR wireless backhaul base station to transmit the access requests to the selected at least one target donor base station through the air interfaces so that the NR wireless backhaul base station may connect to one or more donor base stations simultaneously. In this way, the coverage of a 5G NR network is increased and its performance is improved. In addition, the NR wireless backhaul base station may be deployed independent of transmission resources such as optical fibers, thus can be deployed rapidly and at low cost.

Figure 8:
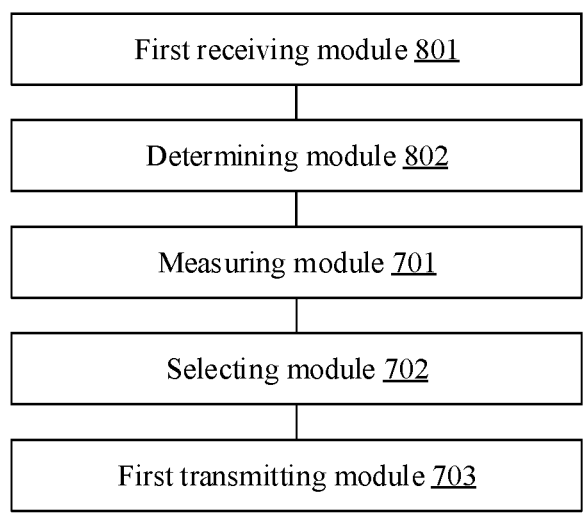
FIG. 8 is a block diagram of a radio access device according to an exemplary embodiment.

In an embodiment, as illustrated in FIG. 8, the radio access device illustrated in FIG. 7 may further include a first receiving module 801 and a determining module 802.

The first receiving module 801 is configured to receive a broadcast message from at least one donor base station. The broadcast message of each donor base station carries indication information used for indicating whether each donor base connects to the macro base station through a wired backhaul link.

The determining module 802 is configured to determine, according to the broadcast message of each donor base station, the donor base stations that connect to the macro base station through the wired backhaul link as the candidate donor base stations.

Figure 9:
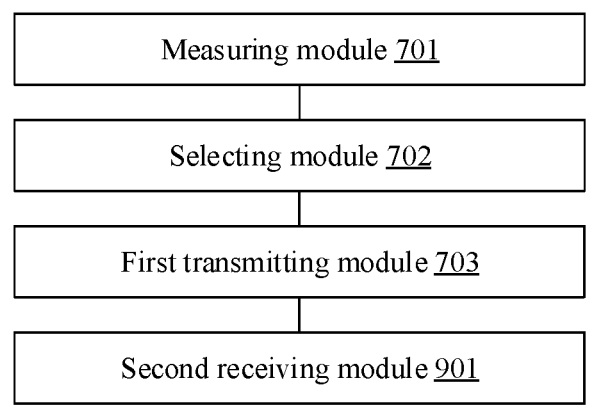
FIG. 9 is a block diagram of a radio access device according to an exemplary embodiment.

In an embodiment, as illustrated in FIG. 9, the radio access device illustrated in FIG. 7 may further includes a second receiving module 901 that is configured to receive an access response from each target donor base station. Each access response carries the radio resource allocated by each target donor base station to the NR wireless backhaul base station.

Figure 10:
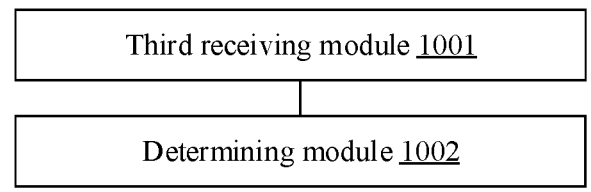
FIG. 10 is a block diagram of a radio access device according to an exemplary embodiment.

FIG. 10 is a block diagram of a radio access device according to an exemplary embodiment. The device may be implemented by software, hardware or a combination of software and the hardware to become a part of a donor base station or a complete donor base station. As illustrated in FIG. 10, the radio access device includes a third receiving module 1001 and a determining module 1002.

The third receiving module 1001 is configured to receive an access request from an NR wireless backhaul base station. The access request is used for requesting the target donor base station to allocate a radio resource to the NR wireless backhaul base station, and the NR wireless backhaul base station communicates with the target donor base station through an air interface.

The determining module 1002 is configured to determine according to the access request whether to permit access requested by the NR wireless backhaul base station.

The device provided in the embodiment of the disclosure may be used to implement the technical solutions of the embodiment illustrated in FIG. 4. The implementation manner and a beneficial effect of the embodiment are similar to those of the embodiment illustrated in FIG. 4.

Figure 11:
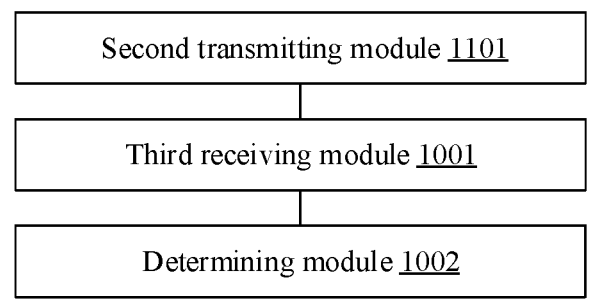
FIG. 11 is a block diagram of a radio access device according to an exemplary embodiment.

In an embodiment, as illustrated in FIG. 11, the radio access device illustrated in FIG. 10 may further include a second transmitting module 1101 that is configured to transmit a broadcast message. The broadcast message carries indication information used for indicating whether the target donor base station connects to a macro base station through a wired backhaul link.

In an embodiment, the determining module 1002 is configured to: forward the access request to a macro base station; receive an access decision message for the access request from the macro base station; and determine according to the access decision message whether to permit the access requested by the NR wireless backhaul base station.

Figure 12:
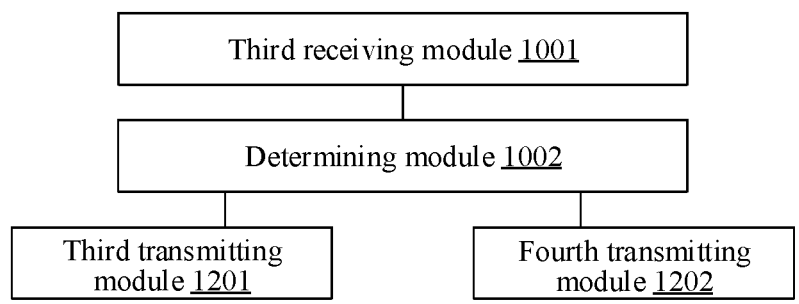
FIG. 12 is a block diagram of a radio access device according to an exemplary embodiment.

In an embodiment, as illustrated in FIG. 12, the radio access device illustrated in FIG. 10 may further include a third transmitting module 1201 and a fourth transmitting module 1202.

The third transmitting module 1201 is configured to, in response to determining that the access requested by the NR wireless backhaul base station is permitted, allocate the radio resource to the NR wireless backhaul base station, and transmit an access response to the NR wireless backhaul base station. The access response carries the radio resource allocated by the target donor base station to the NR wireless backhaul base station.

The fourth transmitting module 1202 is configured to, in response to determining that the access requested by the NR wireless backhaul base station is not permitted, transmit an access failure message to the NR wireless backhaul base station. The access failure message carries indication information used for indicating that the NR wireless backhaul base station is not permitted to access the target donor base station.

Figure 13:
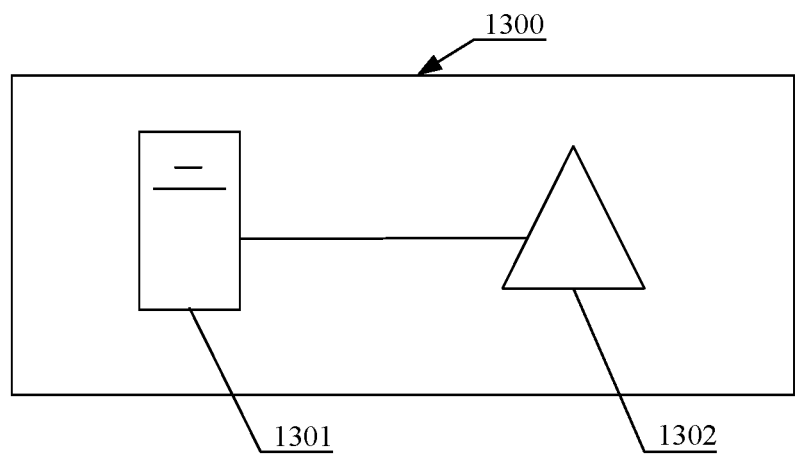
FIG. 13 is a block diagram of a radio access device according to an exemplary embodiment.

FIG. 13 is a block diagram of a radio access device 1300 according to an exemplary embodiment. The radio access device 1300 is applied to an NR wireless backhaul base station and includes:

a processor 1301;

a memory 1302 configured to store instructions executable by the processor.

The processor 1301 is configured to:

perform wireless signal measurement on candidate donor base stations to obtain a measurement result, the NR wireless backhaul base station communicating with each candidate donor base station through an air interface, and each candidate donor base station connecting to a macro base station through a wired backhaul link;

select at least one target donor base station from among the candidate donor base stations according to the measurement result; and transmit an access request to each target donor base station, the access request being used for requesting each target donor base station to allocate a radio resource to the NR wireless backhaul base station.

In an embodiment, the above processor 1301 is further configured to:

receive a broadcast message from at least one donor base station, the broadcast message of each donor base station carrying indication information used for indicating whether each donor base station connects to the macro base station through the wired backhaul link; and determine, according to the broadcast message of each donor base station, the donor base stations that connect to the macro base station through the wired backhaul link as the candidate donor base stations.

In an embodiment, the above processor 1301 is further configured to:

receive an access response from each target donor base station, wherein each access response carries the radio resource allocated by each target donor base station to the NR wireless backhaul base station.

Figure 14:
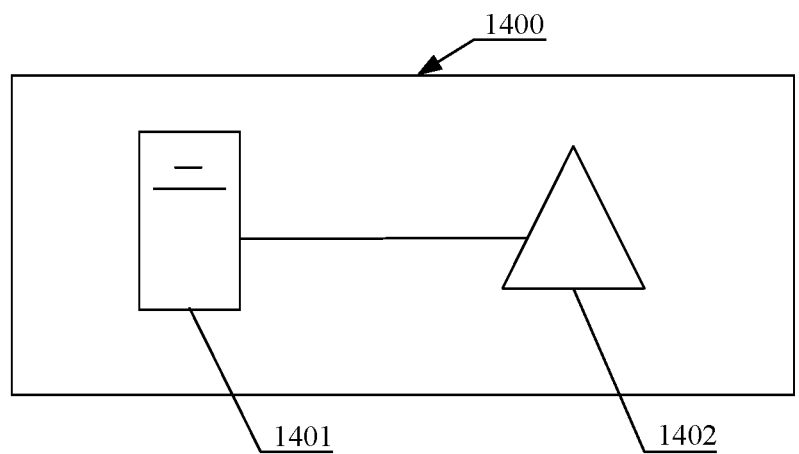
FIG. 14 is a block diagram of a radio access device according to an exemplary embodiment.

FIG. 14 is a block diagram of a radio access device 1400 according to an exemplary embodiment. The radio access device 1400 is applied to a target donor base station and includes:

a processor 1401;

a memory 1402 configured to store instructions executable by the processor.

The processor 1401 is configured to:

receive an access request from an NR wireless backhaul base station, the access request being used for requesting the target donor base station to allocate a radio resource to the NR wireless backhaul base station, and the NR wireless backhaul base station communicating with the target donor base station through an air interface; and determine according to the access request whether to permit access requested by the NR wireless backhaul base station.

In an embodiment, the above processor 1401 is further configured to:

transmit a broadcast message carrying indication information used for indicating whether the target donor base station connects to a macro base station through a wired backhaul link.

In an embodiment, the above processor 1401 is further configured to:

forward the access request to a macro base station;

receive an access decision message for the access request from the macro base station; and determine according to the access decision message whether to permit the access requested by the NR wireless backhaul base station.

In an embodiment, the above processor 1401 is further configured to:

in response to determining that the access requested by the NR wireless backhaul base station is permitted, allocate the radio resource to the NR wireless backhaul base station, and transmitting an access response to the NR wireless backhaul base station, the access response carrying the radio resource allocated by the target donor base station to the NR wireless backhaul base station, or in response to determining that the access requested by the NR wireless backhaul base station is not permitted, transmit an access failure message to the NR wireless backhaul base station, the access failure message carrying indication information used for indicating that the NR wireless backhaul base station is not permitted to access the target donor base station.

A detailed manner adopted by each module of the device in the above embodiments to perform the operations has been described in detail in the embodiments related to the method and is not elaborated herein.

Figure 15:
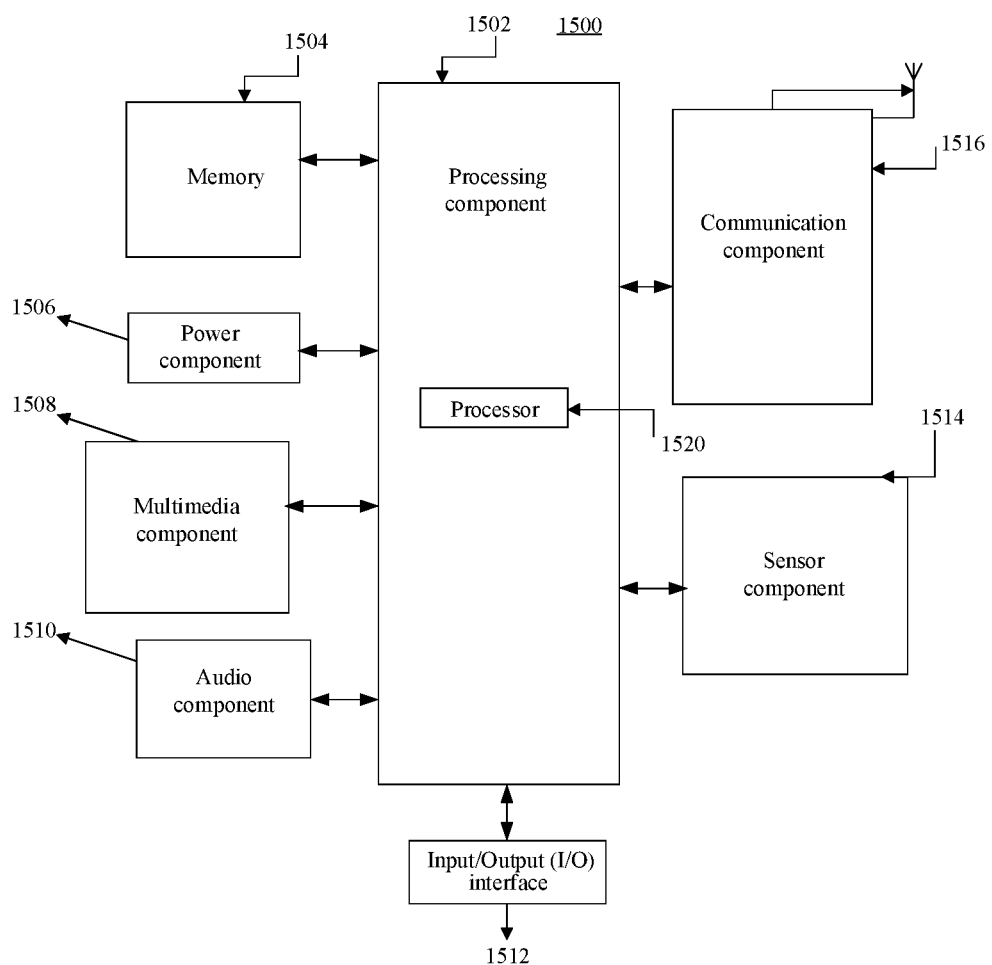
FIG. 15 is a block diagram of a radio access device according to an exemplary embodiment.

FIG. 15 is a block diagram of a radio access device according to an exemplary embodiment of the disclosure. The radio access device 1500 is suitable for an NR wireless backhaul base station and may include one or more of the following components: a processing component 1502, a memory 1504, a power component 1506, a multimedia component 1508, an audio component 1510, an Input/Output (I/O) interface 1512, a sensor component 1514, and a communication component 1516.

The processing component 1502 typically controls overall operations of the radio access device 1500, such as the operations associated with display, telephone calls, data communications, camera operations, and recording operations. The processing component 1502 may include one or more processors 1520 to execute instructions to perform all or part of the operations in the above-mentioned method.

Moreover, the processing component 1502 may include one or more modules which facilitate interaction between the processing component 1502 and the other components. For instance, the processing component 1502 may include a multimedia module to facilitate interaction between the multimedia component 1508 and the processing component 1502.

The memory 1504 is configured to store various types of data to support the operation of the radio access device 1500. Examples of such data include instructions for any application programs or methods operated on the radio access device 1500, contact data, phonebook data, messages, pictures, video, etc. The memory 1504 may be implemented by any type of volatile or non-volatile memory devices, or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, and a magnetic or optical disk.

The power component 1506 provides power for various components of the radio access device 1500. The power component 1506 may include a power management system, one or more power supplies, and other components associated with generation, management and distribution of power for the radio access device 1500.

The multimedia component 1508 includes a screen providing an output interface between the radio access device 1500 and a user. In some embodiments, the screen may include a Liquid Crystal Display (LCD) and a Touch Panel (TP). If the screen includes the TP, the screen may be implemented as a touch screen to receive an input signal from the user. The TP includes one or more touch sensors to sense touches, swipes and gestures on the TP. The touch sensors may not only sense a boundary of a touch or swipe action but also detect a duration and pressure associated with the touch or swipe action. In some embodiments, the multimedia component 1508 includes a front camera and/or a rear camera. The front camera and/or the rear camera may receive external multimedia data when the radio access device 1500 is in an operation mode, such as a photographing mode or a video mode. Each of the front camera and the rear camera may be a fixed optical lens system or have focusing and optical zooming capability.

The audio component 1510 is configured to output and/or input audio signals. For example, the audio component 1510 includes a Microphone (MIC), and the MIC is configured to receive an external audio signal when the radio access device 1500 is in an operation mode, such as a call mode, a recording mode and a voice recognition mode. The received audio signal may further be stored in the memory 1504 or sent through the communication component 1516. In some embodiments, the audio component 1510 further includes a speaker configured to output the audio signal.

The I/O interface 1512 provides an interface between the processing component 1502 and a peripheral interface module, and the peripheral interface module may be a keyboard, a click wheel, a button and the like. The button may include, but not limited to: a home button, a volume button, a starting button and a locking button.

The sensor component 1514 includes one or more sensors configured to provide status assessment in various aspects for the radio access device 1500. For instance, the sensor component 1514 may detect an on/off status of the radio access device 1500 and relative positioning of components, such as a display and small keyboard of the radio access device 1500, and the sensor component 1514 may further detect a change in a position of the radio access device 1500 or a component of the radio access device 1500, presence or absence of contact between the user and the radio access device 1500, orientation or acceleration/deceleration of the radio access device 1500 and a change in temperature of the radio access device 1500. The sensor component 1514 may include a proximity sensor configured to detect presence of an object nearby without any physical contact. The sensor component 1514 may also include a light sensor, such as a Complementary Metal Oxide Semiconductor (CMOS) or Charge Coupled Device (CCD) image sensor, configured for use in an imaging application. In some embodiments, the sensor component 1514 may also include an acceleration sensor, a gyroscope sensor, a magnetic sensor, a pressure sensor or a temperature sensor.

The communication component 1516 is configured to facilitate wired or wireless communication between the radio access device 1500 and another device. The radio access device 1500 may access a communication-standard-based wireless network, such as a Wireless Fidelity (Wi-Fi) network, a 2nd-Generation (2G), a 3rd-Generation (3G) network, a 4th-Generation (4G) network, a 5th-Generation (5G) network, a combination thereof or an intercom network. In an exemplary embodiment, the communication component 1516 receives a broadcast signal or broadcast associated information from an external broadcast management system through a broadcast channel. In an exemplary embodiment, the communication component 1516 further includes a Near Field Communication (NFC) module to facilitate short-range communication. For example, the NFC module may be implemented based on a Radio Frequency Identification (RFID) technology, an Infrared Data Association (IrDA) technology, an Ultra-WideBand (UWB) technology, a Bluetooth (BT) technology and another technology.

In an exemplary embodiment, the radio access device 1500 may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, microprocessors or other electronic components, and is configured to perform the above described methods.

In an exemplary embodiment, there is also provided a non-transitory computer-readable storage medium including an instruction, such as the memory 1504 including an instruction, and the instruction may be executed by the processor 1520 of the radio access device 1500 to implement the above described method. For example, the non-transitory computer-readable storage medium may be a Read-Only Memory (ROM), a Random Access Memory (RAM), a Compact Disc Read-Only Memory (CD-ROM), a magnetic tape, a floppy disc, an optical data storage device and the like.

Figure 16:
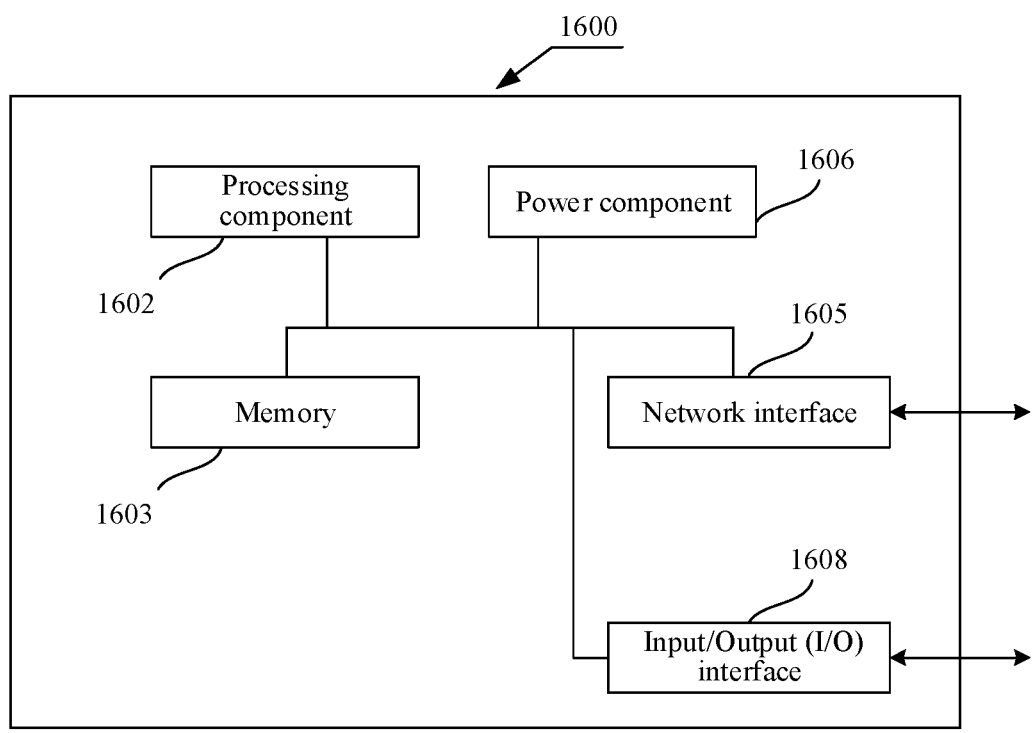
FIG. 16 is a block diagram of a radio access device according to an exemplary embodiment.

FIG. 16 is a block diagram illustrating a radio access device 1600 according to an exemplary embodiment. For example, the radio access device 1600 may be provided as a server. The radio access device 1600 includes a processing component 1602, which further includes one or more processors, and a memory resource represented by a memory 1603 which stores instructions (such as an application program) executable by the processing component 1602. The application program stored in the memory 1603 may include one or more modules, each of which corresponds to a set of instructions. Moreover, the processing component 1602 is configured to execute the instructions to perform the above method.

The radio access device 1600 may further include a power component 1606 configured to conduct power management of the radio access device 1600, a wired or wireless network interface 1605 configured to connect the radio access device 1600 to a network, and an I/O interface 1608. The radio access device 1600 may operate based on an operation system stored in the memory 1603 such as Windows Server™, Mac OS X™, Unix™, Linux™, FreeBSD™ and the like.

A non-transitory computer-readable storage medium is provided. For example, the non-transitory computer-readable storage medium may be an ROM, an RAM, a CD-ROM, a magnetic tape, a floppy disk, an optical data storage device or the like. Instructions in the storage medium, when executed by a processor of the radio access device 1500 or a processor of the radio access device 1600, cause the radio access device 1500 or the radio access device 1600 to execute the following method. The method includes following operations:

wireless signal measurement is performed on candidate donor base stations to obtain a measurement result, the NR wireless backhaul base station communicating with each candidate donor base station through an air interface, and each candidate donor base station connecting to a macro base station through a wired backhaul link;

at least one target donor base station are selected from among the candidate donor base stations according to the measurement result; and an access request is transmitted to each target donor base station, the access request being used for requesting each target donor base station to allocate a radio resource to the NR wireless backhaul base station.

In an embodiment, the method further includes following operations: before the wireless signal measurement is performed on the candidate donor base stations to obtain the measurement result, a broadcast message is received from at least one donor base station, the broadcast message of each donor base station carrying indication information used for indicating whether each donor base station connects to the macro base station through the wired backhaul link; and according to the broadcast message of each donor base station, the donor base stations that connect to the macro base station through the wired backhaul link are determined as the candidate donor base stations.

In an embodiment, the method further includes a following operation:

an access response is received from each target donor base station, each access response carrying the radio resource allocated by each target donor base station to the NR wireless backhaul base station.

Other implementations of the present disclosure will be apparent to those skilled in the art from consideration of the specification and practice of the present disclosure. The disclosure is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the following claims.

It will be appreciated that the present disclosure is not limited to the exact construction that has been described above and illustrated in the accompanying drawings, and that various modifications and changes may be made without departing from the scope thereof. It is intended that the scope of the present disclosure only be limited by the appended claims.

The invention claimed is:

1. A radio access method, executed by a New Radio (NR) wireless backhaul base station, the method comprising:
    receiving a broadcast message from at least one donor base station, wherein the broadcast message of each donor base station carries indication information used for indicating whether each donor base station connects to a macro base station through the wired backhaul link;
    determining, according to the broadcast message of each donor base station, the donor base stations that connect to the macro base station through a wired backhaul link as candidate donor base stations;
    performing wireless signal measurement on the candidate donor base stations to obtain a measurement result, wherein the NR wireless backhaul base station communicates with each candidate donor base station through an air interface;
    selecting at least one target donor base station from among the candidate donor base stations according to the measurement result; and
    transmitting an access request to each target donor base station, wherein the access request is used for requesting each target donor base station to allocate a radio resource to the NR wireless backhaul base station.

2. The method of claim 1, further comprising:
    receiving an access response from each target donor base station, wherein each access response carries the radio resource allocated by each target donor base station to the NR wireless backhaul base station.

3. A radio access method, executed by a target donor base station, the method comprising:
    transmitting a broadcast message, wherein the broadcast message carries indication information used for indicating whether a target donor base station connects to a macro base station through a wired backhaul link;
    receiving an access request from a New Radio (NR) wireless backhaul base station, wherein the access request is used for requesting the target donor base station to allocate a radio resource to the NR wireless backhaul base station, and the NR wireless backhaul base station communicates with the target donor base station through an air interface; and
    determining, according to the access request, whether to permit access requested by the NR wireless backhaul base station,
    wherein the target donor base station is selected from candidate donor base stations according to a measurement result obtained from wireless signal measurement performed on candidate donor base stations by the NR wireless backhaul base station.

4. The method of claim 3, wherein determining according to the access request whether to permit the access requested by the NR wireless backhaul base station comprises:
    forwarding the access request to a macro base station;
    receiving an access decision message for the access request from the macro base station; and
    determining according to the access decision message whether to permit the access requested by the NR wireless backhaul base station.

5. The method of claim 3, further comprising: after determining according to the access request whether to permit the access requested by the NR wireless backhaul base station,
- in response to determining that the access requested by the NR wireless backhaul base station is permitted, allocating the radio resource to the NR wireless backhaul base station, and transmitting an access response to the NR wireless backhaul base station, wherein the access response carries the radio resource allocated by the target donor base station to the NR wireless backhaul base station, or
- in response to determining that the access requested by the NR wireless backhaul base station is not permitted, transmitting an access failure message to the NR wireless backhaul base station, wherein the access failure message carries indication information used for indicating that the NR wireless backhaul base station is not permitted to access the target donor base station.

6. A radio access device for use in a New Radio (NR) wireless backhaul base station, the device comprising:
- a processor;
- memory configured to store instructions executable by the processor,
- wherein the processor is configured to:
- receive a broadcast message from at least one donor base station, wherein the broadcast message of each donor base station carries indication information used for indicating whether each donor base station connects to a macro base station through a wired backhaul link;
- determine, according to the broadcast message of each donor base station, the donor base stations that connect to the macro base station through the wired backhaul link as the candidate donor base stations;
- perform wireless signal measurement on candidate donor base stations to obtain a measurement result, wherein the NR wireless backhaul base station communicates with each candidate donor base station through an air interface;
- select at least one target donor base station from among the candidate donor base stations according to the measurement result; and
- transmit an access request to each target donor base station, wherein the access request is used for requesting each target donor base station to allocate a radio resource to the NR wireless backhaul base station.

7. The device of claim 6, wherein the processor is further configured to:
- receive an access response from each target donor base station, wherein each access response carries the radio resource allocated by each target donor base station to the NR wireless backhaul base station.

8. A radio access device for use in a target donor base station and configured to perform operations of the radio access method of claim 4, the device comprising:
- a processor;
- memory configured to store instructions executable by the processor.

9. The device of claim 8, wherein to determine according to the access request whether to permit the access requested by the NR wireless backhaul base station, the processor is further configured to:
- forward the access request to a macro base station; receive an access decision message for the access request from the macro base station; and determine according to the access decision message whether to permit the access requested by the NR wireless backhaul base station.

10. The device of claim 8, wherein the processor is further configured to, after the determining according to the access request whether to permit the access requested by the NR wireless backhaul base station:
- in response to determining that the access requested by the NR wireless backhaul base station is permitted, allocate the radio resource to the NR wireless backhaul base station, and transmit an access response to the NR wireless backhaul base station, wherein the access response carries the radio resource allocated by the target donor base station to the NR wireless backhaul base station; or
- in response to determining that the access requested by the NR wireless backhaul base station is not permitted, transmit an access failure message to the NR wireless backhaul base station, wherein the access failure message carries indication information used for indicating that the NR wireless backhaul base station is not permitted to access the target donor base station.

11. A non-transitory computer-readable storage medium having stored thereon computer instructions that, when executed by a processor, cause the method of claim 1 to be implemented.

12. The non-transitory computer-readable storage medium of claim 11, wherein the method further comprises:
- receiving an access response from each target donor base station, wherein each access response carries the radio resource allocated by each target donor base station to the NR wireless backhaul base station.

13. A non-transitory computer-readable storage medium having stored thereon computer instructions that, when executed by a processor, cause the method of claim 3 to be implemented.

14. The non-transitory computer-readable storage medium of claim 13,
- wherein the determining according to the access request whether to permit the access requested by the NR wireless backhaul base station comprises:
- forwarding the access request to a macro base station;
- receiving an access decision message for the access request from the macro base station; and
- determining according to the access decision message whether to permit the access requested by the NR wireless backhaul base station.

15. A communication system, comprising a radio access device for use in the NR wireless backhaul base station of claim 6 and the target donor base stations, wherein the selected one target donor base station is configured to:
- receive the access request from the NR wireless backhaul base station, wherein the access request is used for requesting the target donor base station to allocate a radio resource to the NR wireless backhaul base station, and the NR wireless backhaul base station communicates with the target donor base station through the air interface; and
- determine according to the access request whether to permit access requested by the NR wireless backhaul base station.

* * * * *